United States Patent [19]

Simecek et al.

[11] 3,945,730
[45] Mar. 23, 1976

[54] ARRANGEMENT FOR MEASURING, CHECKING AND CONTROL OF THE POSITION OF CHOSEN POINTS OF OBJECTS WITH RESPECT TO AN OPTICAL AIMING LINE

[75] Inventors: Tomislav Simecek; Emil Sipek, both of Prague, Czechoslovakia

[73] Assignee: Ceskoslovenska Akademie Ved, Prague, Czechoslovakia

[22] Filed: Aug. 13, 1973

[21] Appl. No.: 387,671

[52] U.S. Cl............. 356/167; 250/222 R; 250/571; 356/156; 356/172
[51] Int. Cl.²...................................... G01B 11/00
[58] Field of Search........... 356/158, 167, 172, 156, 356/159, 160, 161; 250/202, 560, 561, 221, 222 R, 224, 548, 571, 222

[56] References Cited
UNITED STATES PATENTS

| | | | |
|---|---|---|---|
| 2,050,737 | 8/1936 | Schriever | 250/210 |
| 2,824,486 | 2/1958 | Lawrance et al. | 356/167 |
| 3,129,335 | 4/1964 | Stewart | 356/172 |
| 3,334,236 | 8/1967 | Bacon | 250/227 |
| 3,604,940 | 9/1971 | Matthews | 356/167 |
| 3,655,989 | 4/1972 | Robinson | 356/159 |
| 3,708,232 | 1/1973 | Walsh | 356/172 |
| 3,730,633 | 5/1973 | Kennedy | 356/167 |
| 3,778,168 | 12/1973 | Willner | 356/172 |
| 3,795,449 | 3/1974 | McKay | 356/172 |

*Primary Examiner*—Alfred E. Smith
*Assistant Examiner*—Richard A. Rosenberger

[57] ABSTRACT

Arrangement for measuring, checking and control of the position of chosen points of objects with respect to an optical aiming line, which optical aiming line is determined as a connecting line between the center of an optical system of a transmitter of a light measuring beam and of the center of an optical system of a receiver, selectively sensitive to the wavelength and modulation of the light measuring beam. The position of the body with respect to this optical aiming line is determined by the screening of the light measuring beam by means of circumference of this body or by means of the edge of a screen connected with this body. A substantial feature of this invention is the application of directional optical slot systems both for the transmitter and for the receiver selection of proper sizes of outlet slots of these optical slot systems. Another substantial feature of this invention is the application of a semiconductor light emitting element in the transmitter and of a small area semiconductor photodetector with additional illumination by an auxiliary light emission diode in the receiver. Means for preventing the influence of variations of properties of the optical medium and of possible obstacles in the space of propagation of the measuring beam are equally mentioned. Furthermore means are provided for automatic control of the contact of the measuring edge of the screen with the optical aiming line and means for control of the position of the body, connected with this screen, with respect to the optical aiming line.

3 Claims, 11 Drawing Figures

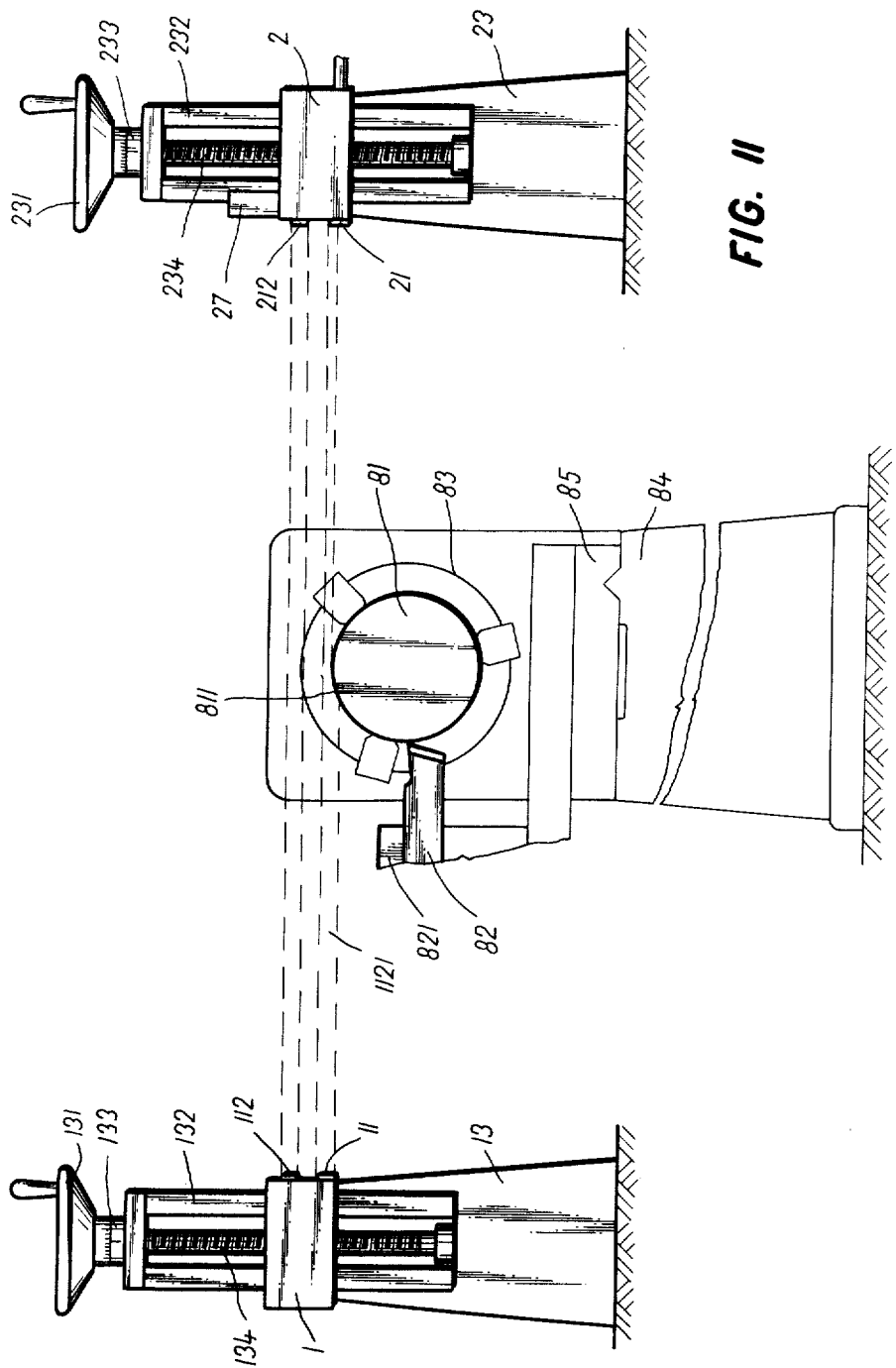

ARRANGEMENT FOR MEASURING, CHECKING AND CONTROL OF THE POSITION OF CHOSEN POINTS OF OBJECTS WITH RESPECT TO AN OPTICAL AIMING LINE

BACKGROUND OF THE INVENTION

This invention relates to an arrangement for measuring, checking and control of the position of, chosen points of bodies with respect to an optical aiming line for accurate measuring of the shape of bodies or of variations of their position or shape with respect to this line and for guiding of bodies along tracks determined with respect to this line.

Actual requirements on measuring and surveying operations in geodesy, in building industries, in transport, in metallurgy, in mining, machinery and in other branches call in a growing degree for such measuring methods, which would allow a full automation for an application in the longest range and with highest accuracy of these operations, i.e. in the first line an automatic registration of the results of measurements or an automatic control of some manufacturing processes according to results of these measurements. Known devices for accurate geodetic measurements are now practically all based on the principle of observation of surveying marks by means of cross lines of optical apparatus of different accuracy where it it possible to provide an automatic reading of angular values or distances, but the human factor influences predominantly the adjustments for each individual measurements, limiting not only the accuracy, but also a full automation of the measurements. Tracing laser beams have been used with success where it is possible to work in a completely homogenous medium with Fresnell optics (vacuum systems of linear accelerators). At common atmospheric conditions the coherent length and thus also the range of similar systems are however reduced to auch an extent, that they loose any practical value. Arrangements using laser beams with conventional optics offer rather problems with parasitic deflection effects and they generally operate with different complicated photoelectric systems for evaluation of the energetic center of the beam, this method being problematical even if stabilized single mode lasers are used. The results obtained with these devices are relatively satisfactory — it is possible to achieve also a fully automatic evaluation of measurements, but with high requirements on time for these measurements, or with relatively low accuracy, rapidly decreasing with the distance. So far these arrangements should achieve a higher accuracy or some automation of the evaluation, they strictly require at the place of the measured object a relatively demanding and delicate evaluating device, so that they are unsuitable for working under unfavourable conditions. Drawbacks which cannot be overlooked are in addition to the delicacy of the arrangement also the generally high consumption of energy, the size, weight, short life time and relatively high first costs.

The accuracy of these arrangements, the principle of which can be in short characterized as surveying by means of an aiming line in a chosen vertical plane, determined by one point and by an angle, which this line forms with a reference plane (for instance with a horizontal plane), depends of course on the angular stability of the optical axis of the laser or of the telescope with cross lines, which increases its influence with the increasing distance of the measured object. This drawback is substantially reduced at arrangements, using the method of screening the optical beam which is propagated between a transmitter and a receiver — what can be similarly characterized as surveying by means of an aiming line determined by its two end points.

A number of different arrangements are already known, based on this principle, which is rather convenient, as it allows in a natural way to fully automatize the measurement, there are however different drawbacks, which prevent their application for more accurate surveying. It is above all the not uniform sensitivity and the relatively low accuracy of measurement in different points along the measuring track, a short range of performance, dependence of the accuracy of measurements on variations of the external light conditions or changes of optical properties of the medium along the measuring track, use of mechanical elements (for instance of rotating choppers) and generally also a high consumption of energy and a short life time of the arrangement.

SUMMARY OF THE INVENTION

It is an object of this invention to reduce substantially or to eliminate drawbacks of the above mentioned arrangements for accurate surveying operations, i.e. to provide an arrangement, which, after being established on the measuring track, would enable a stable and accurate reading of distances of the given objects from at least one aiming line with constant accuracy and sensitivity at any place along the measuring track, with the possibility to automatize the reading, to register the signal automatically and to use it possibly as signal for automatic regulation, and, while achieving these results to avoid any substantial influence of variations of the external illumination or of changes of optical properties of the medium along the measuring track, and to avoid any substantial influence of angular unstability of optical axis of parts of the arrangement, situated at the beginning and at the end of the measuring track on the overall accuracy of measurements. The arrangement according to this invention requires thereby at the measured point no delicate optical evaluating devices, has a very low energy consumption, is cheap, comprises substantially no quickly moving mechanical parts, shows therefore a very limited wear, so that its life time can be considered to be very long.

According to this invention, the transmitter of the measuring beam of light comprises a semiconductor light emitting element with an optical directional slot system. The receiver of this measuring beam of light comprises a semiconductor photodetector, provided with an optical directional slot system, the slot of which has the same width and/or length as the slot of the optical transmitter system and is parallel therewith. A screen is provided in the space of propagation of the measuring beam of light between the transmitter and receiver, which screen is connected stationary or by way of a motion device to the chosen point of the object, the position of which with respect to the optical aiming line has to be measured, checked and/or controlled. The semiconductor photodetector is provided with a light emitting diode with DC supply, whereby the photosensitive surface of the photodetector is within the emission angle of this photoemission diode.

The transmitter or receiver can also comprise a semiconductor light emitting element of a light reference beam and the receiver of transmitter is in that case provided with a semiconductor photodetector of this light reference beam and with a circuit for comparison of the intensity of the signal, transmitted by the measuring and reference beam respectively.

The transmitter or receiver can furthermore comprise a semiconductor light emitting element of a blocking beam of light and the receiver or transmitter has in that case an additional semiconductor photodetector of this blocking beam and a blocking circuit indicating the screening of the blocking beam by an accidental obstacle.

The screen can be directly represented by the circumference of the object, the position of which should be measured, checked or controlled.

The motion device, by means of which the screen is connected with the selected point of the object, the position of which with respect to the optical aiming line is measured, checked, and/or controlled, is controlled in dependence on the intensity of the signal of the receiver of the measuring beam and/or according to a predetermined program in dependence on the track covered by the object.

The transmitter and/or receiver of the light measuring beam can be provided with levelling means, the optical axis of which is parallel with the optical axis of the directional slot system of the transmitter and/or receiver of the light measuring beam, whereby the distance of these two axes is exactly known.

The invention will be in the following described on examplary embodiments and applications on hand of attached drawings.

DESCRIPTION OF THE DRAWINGS

In the drawings,

FIG. 11 a machine tool, for instance a lathe, where the diameter of the worked part is measured by the arrangement according to this invention.

DESCRIPTION OF PREFERRED EMBODIMENTS

Figure 1:
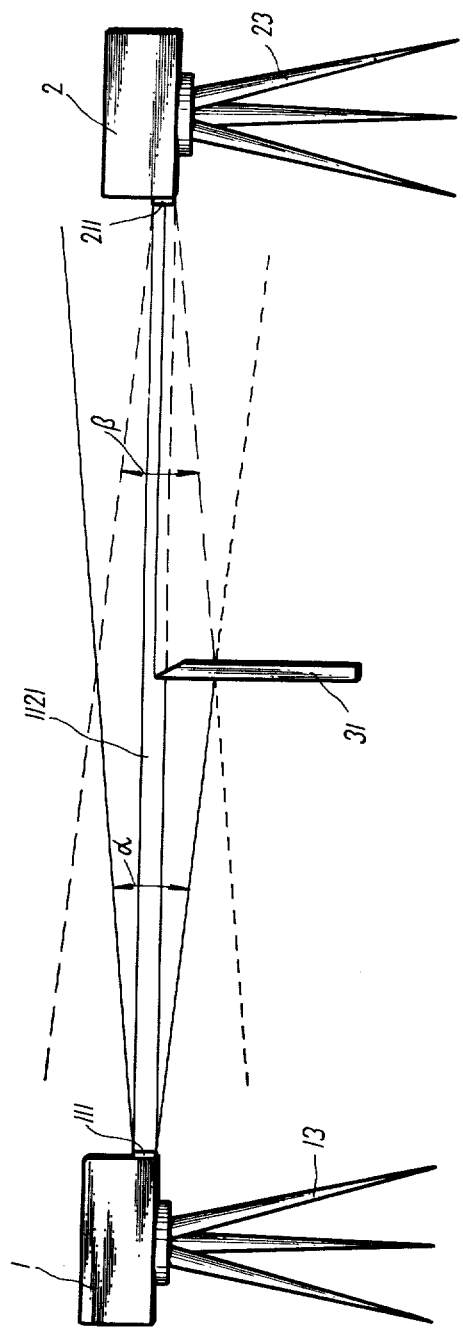
FIG. 1 represents the fundamental outline of the arrangement according to this invention.

FIG. 1 shows an overall view of an arrangement consisting of a transmitter 1 of a modulated beam of light, of a receiver 2 of this beam and of a screen 31 within the area of propagation of this beam of light from the transmitter 1 to the receiver 2. A condition of a correct operation is that the receiver 2 is situated within the emission angle $\alpha$ of the transmitter 1 and that the transmitter 1 is simultaneously within the receiving angle $\beta$ of the receiver 2. The arrangement has the largest range and accuracy if the transmitter 1 is on the axis of the receiving angle $\beta$ of the receiver 2 and simultaneously the receiver 2 on the axis of the transmitting angle $\alpha$ of the transmitter 1. The screening of the beam of light from the transmitter 1 can be indicated only if the screen 31 is within the active zone 1121 of this beam, which represents the space of a parallelepipede with a base formed by the slot 111 of the optical slot system 11 of the transmitter 1 and by the slot 211 of the optical slot system 21 of the receiver 2. A condition of correct operation of the arrangement is, that the receiver 2 is in a substantial manner sensitive to the wave length and modulation method of the radiation emitted by the transmitter 1. The transmitter 1 and receiver 2 are situated on stands 13 and 23 for instance on tripods.

Figure 2:
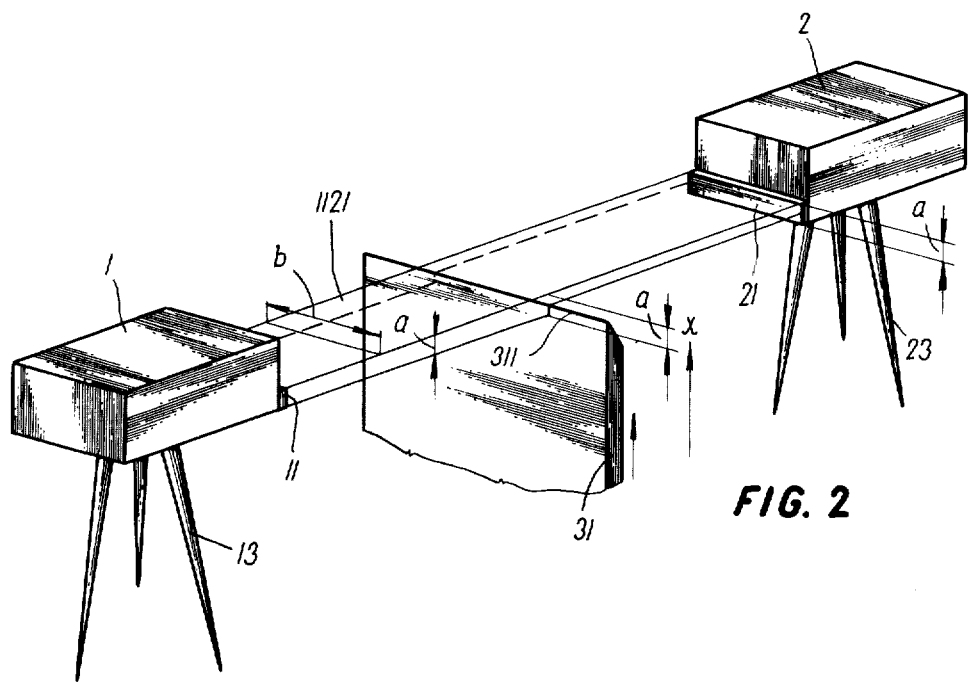
FIG. 2 is an arrangement where the edge of the screen is parallel with the longer side of the slot.

FIG. 2 shows one of possible suitable arrangements where both the transmitter 1 and the receiver 2 are situated on stands 13 and 23 respectively and are provided with optical slot systems 11 and 21 with slots 111 and 211, the width $b$ of which is substantially larger than their height $a$. The widest range and highest accuracy can be obtained if the slots 111 and 211 are equal and the sides of these slots 111 and 211, corresponding in length are parallel, in which case, shown in FIG. 2, the active zone 1121 of the radiating beam of the transmitter 1 has the shape of a prism, the base of which are the mentioned slots 111 and 211. The working edge 311 of the screen 31 is parallel with the longer sides of the slots 111 and 211, whereby a steep dependence of the light intensity incident on the optical slot system 21 of the receiver 2 on the motion of the screen 31 in direction $x$ is obtained as shows in FIG. 4 by the curve $k$.

Figure 3:
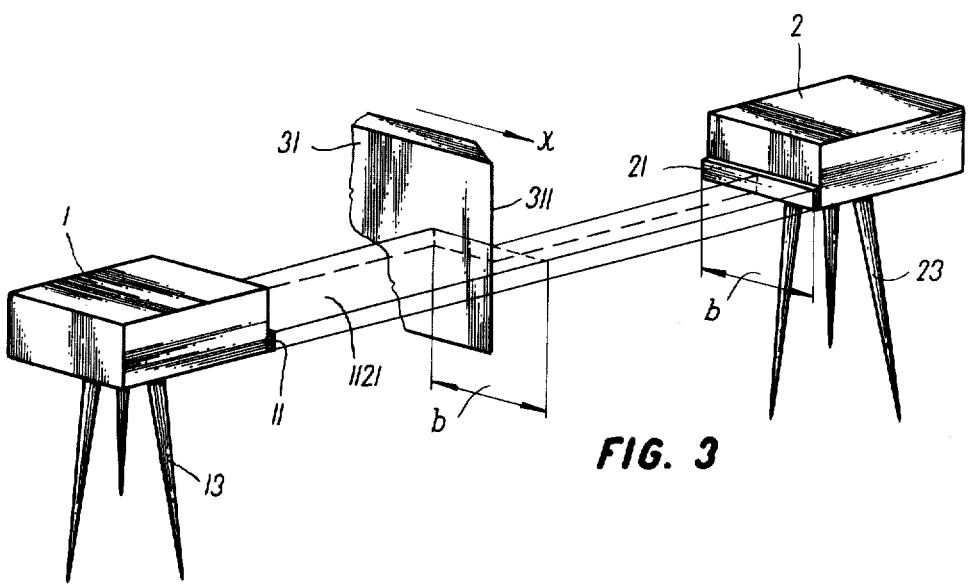
FIG. 3 is an arrangement where the edge of the screen is parallel with the shorter side of the slot.
Figure 4:
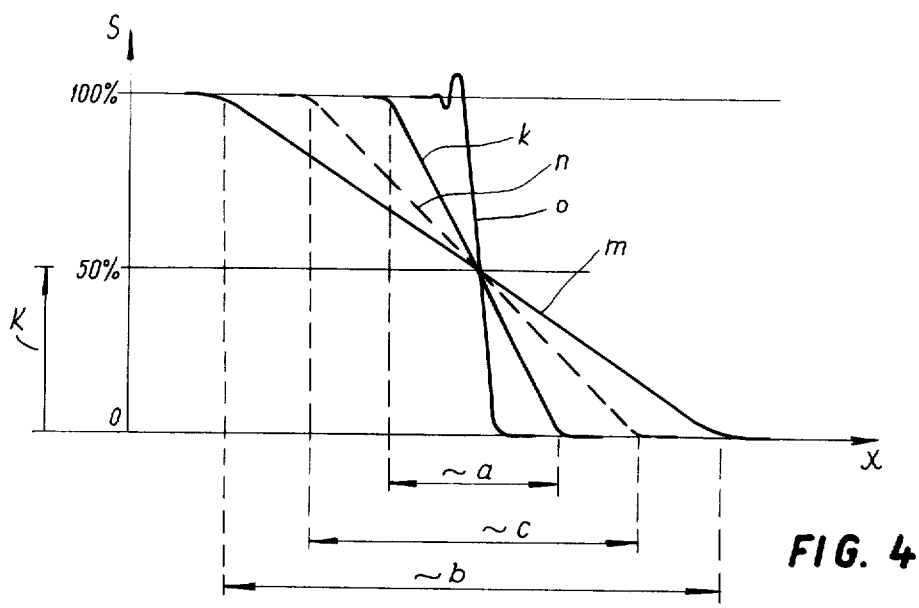
FIG. 4 shows the dependence of the output signal of the receiver of the measuring beam of light on the degree of screening of the active zone of this beam.

FIG. 3 shows another suitable embodiment, where contrary to that of FIG. 2 the working edge 311 of the screen 31 is oriented parallel with the shorter sides of the slots 111 and 211, obtaining thereby a large range of linear dependence of the intensity of radiation, incident on the optical slot system 21 of the receiver 2, on the movement of the screen 31 in direction $x$ as indicated in FIG. 4 by the curve $m$.

FIG. 4 shows the dependence of the intensity of light incident on the optical slot system 21 of the receiver 2 on the movement of the screen 31 in direction $x$. The dependence according to curve $k$ relates to the arrangement according to FIG. 2, where $a$ is the height of the slot 111 of the optical slot system 11 of the arrangement 1 and the slot 211 of the optical slot system 21 of the receiver 2 and simultaneously also the height of the active zone 1121 of the light beam transmitted by the transmitter 1. The relative magnitude of the intensity of light incident on the optical slot system 21 is plotted in direction of the axis $s$ and its dependence on the depth of screening of the active zone 1121 by the screen 31 is within the range of the height $a$ approximately linear and very steep.

The dependence according to the curve $m$ corresponds to the arrangement according to FIG. 3, where $b$ is the width of the slot 111 of the optical slot system 11 of the transmitter 1 and simultaneously also of the slot 211 of the optical slot system 21 of the receiver 2 and therefore also the width of the active zone 1121 of the light beam from the transmitter 1. The dependence of the relative light intensity incident on the optical slot system 21 on the screening of the active zone 1121 by the screen 31 is within the range of the width $b$ practically linear and gradual, enabling an evaluation of the position of the screen 31 with respect to the active zone 1121 within a wide range of positions, of course with reduced accuracy.

The dependence according to the curve $n$ corresponds to an arrangement, where the working edge 311 of the screen is with respect to the sides of the slots 111, 211 of the optical slot systems 11 and 21 at a common angle. It is thus possible to achieve within the range $c$ an approximately linear dependence of the relative light intensity, incident on the optical slot system 21 on the screening of the active zone 1121 by the screen 31, whereby the range $c$ can be adjusted by suitable selection of the angle within a range from $a$ up to $b$.

The dependence according to the curve $o$ corresponds to an arrangement, where the height of the slots 111, 211 of the optical slot systems 11 and 21 is chosen so narrow, that it is of the order of the wave length of the radiation used so that the signal detected by the receiver 2 is determined predominantly by the diffraction effect on the working edge 311 of the screen 31.

Figure 5:
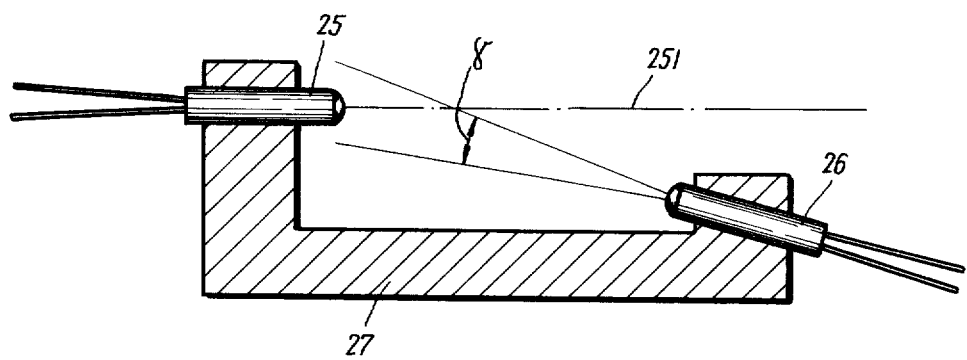
FIG. 5 shows in a partly cross sectional elevation a semiconductor photodetector with a light emitting diode for additional illumination.

FIG. 5 shows a semiconductor photodetector 25 situated in a holder 27 supporting also a light emitting diode 26 so that it is beyond the optical axis 251 of the photodetector 25, but within the radiation angle $\gamma$ of the light emitting diode 26, fed by DC current. The photodetector 25 is therefore illuminated at a constant intensity so that it is possible to adjust the working point of the photodetector 25 into the range of maximum sensitivity and simultaneously to reduce the effect of variations of the natural external. Illumination of the photodetector 25 on changes of its sensitivity. By the application of a light emitting diode 26 we can achieve contrary to other sources of radiation a favourable improvement of the signal to noise ratio.

Figure 6:
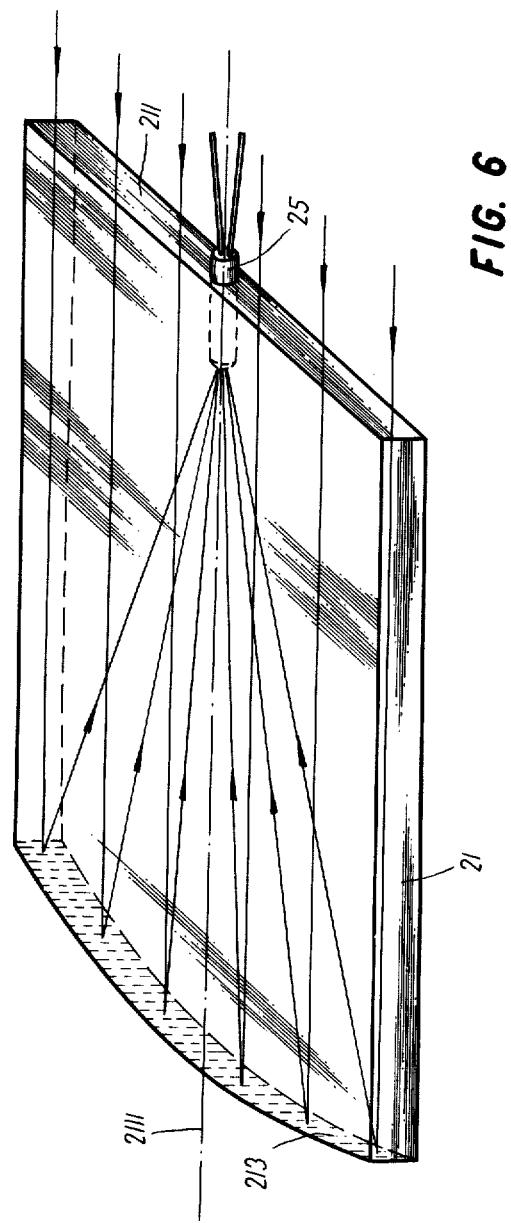
FIG. 6 a semiconductor photodetector with an optical directional slot system.

FIG. 6 shows a semiconductor photodetector 25 provided with an optical directional slot system 21, consisting of a narrow cut 213 of a parabolic, spheric or cylindrical mirror, the optical axis 2111 of which is in the direction of the received light beam. The space between the cut 213 and the photodetector 25 can be filled with a transparent optical medium. The optical inlet surface of the optical slot system 21 has the shape of a narrow slot 211. This arrangement enables detection of a flat parallel light beam.

Figure 7:
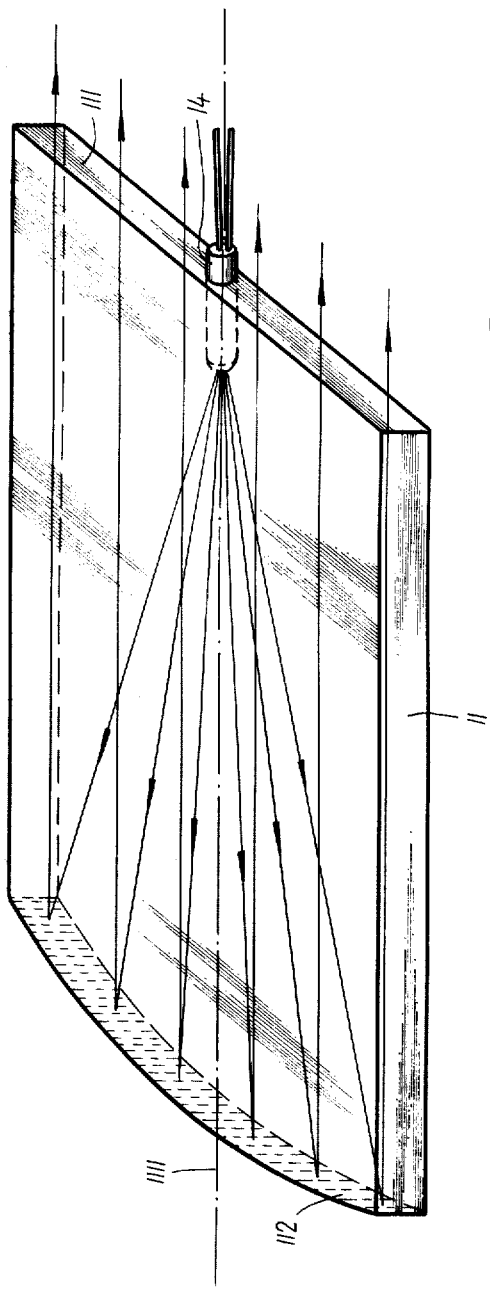
FIG. 7 a semiconductor light emitting element with an optical directional slot system.

FIG. 7 shows a semiconductor light emitting element 14 provided with a directional slot system 11 having a narrow cut 112 of a parabolic, spheric or cylindrical mirror, the optical axis 1111 of which is coincident with the axis of the radiating diagram of the light emitting element 14. The cut 112 is oriented so as to be in the plane of the maximum divergence of the beam of the light emitting element 14. The light beam leaves the optical system 11 through the slot 111. The space between the cut 112 and the light emitting element 14 can be filled with some optical medium.

The cuts 213 and 113 of the spherical or cylindrical mirror as indicated in FIG. 6 and FIG. 7 can be replaced by cuts of a spherical or cylindrical lens.

Figure 8:
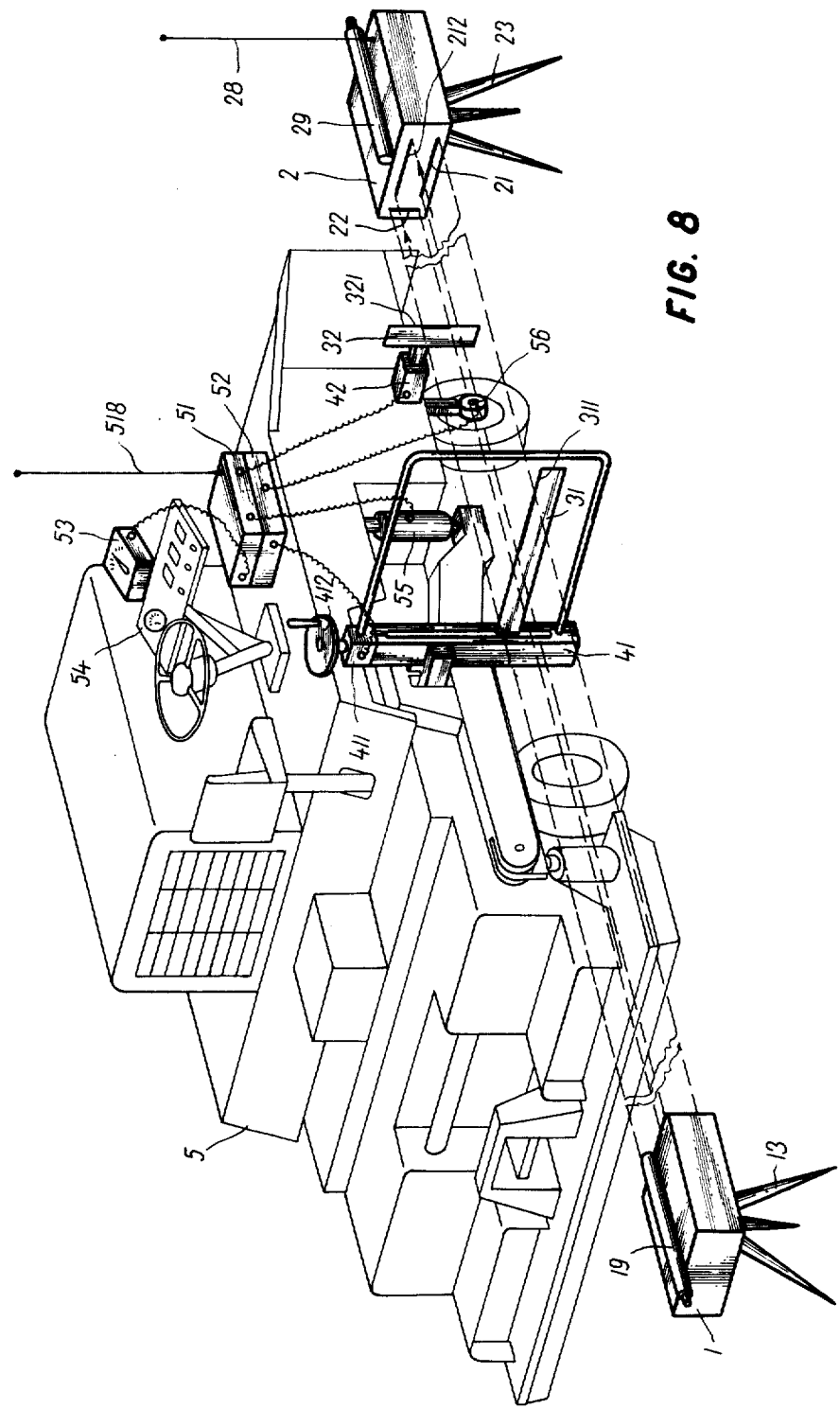
FIG. 8 the view of a building machine, of a finisher, the operation of which is controlled by the arrangement according to this invention.

FIG. 8 shows a building machine — a finisher 5 — provided with an arrangement according to this invention. A transmitter 1 on a stand 13 is provided on one end of the working track of the finisher 5, a receiver 2 on a stand 25 on the other end of the working track.

A screen 31 with a horizontal working edge 311 is situated on the finisher 5 by means of a motion device 41. The position of the screen 31 with respect to the finisher 5 is adjusted by a control wheel 412 controlling the motion device 41. The information about the degree of screening is transmitted wirelessly from the antenna 28 of the receiver 2 to the antenna 518 of the device 51 for evaluation of informations about screening of the measuring light beams transmitted by way of the optical slot system of the transmitter 1 and received by way of the optical slot systems 21 and 22 of the receiver 2. The operation of the hydraulic system 55 for adjustment of the thickness of the layer deposited by the finisher 5 is controlled in dependence on the screening of the radiating beam received by way of the optical slot system 21.

The motion device 42 of the screen 32 is controlled in dependence on the screening of the measuring beam of light received by way of the optical slot system 22 so as to maintain the working edge 321 of the screen 32 in the middle of the active zone of this beam. The information about the position of the screen 32 with respect to the finisher 5 is transmitted to the position indicator 53 situated on the control panel 54 of the finisher 5. The direction of the movement of the finisher 5 can be controlled according to this information. The described arrangement enables to build straight sections of roadways, whereby a program device 52 which adjusts according to readings of the pick-up device 56 by way of the servomechanism 411 the motion device 41 and thus also the position of the screen 31 with respect to the body of the finisher 5 is used for building sections with changing inclination. Program corrections for building turns can be introduced into the guiding system 32, 42, 51, 53 of the finisher 5 on the base of informations of the pick-up device 56. The reference beam of light received by the optical slot system 212 serves both for the relative evaluation of the signal of the light beams received by way of the optical slot systems 21 and 22 for increasing the accuracy and limiting the influence of changes of transmissivity of the optical medium between the transmitter 1 and receiver 2 and as a blocking beam, since the circuits of the receiver 2 are arranged so that they indicate a full screening of the beam as presence of some undesirable obstacle in the space between transmitter 1 and receiver 2.

Levelling means 19 on the transmitter 1 and levelling means 29 on the receiver 2 serve both for an easy mutual adjustment of the transmitter 1 and receiver 2 in positions as indicated in FIG. 1 and for transfer of informations about the positions of both ends of the optical aiming line with respect to surveying marks in the terrain.

Figure 9:
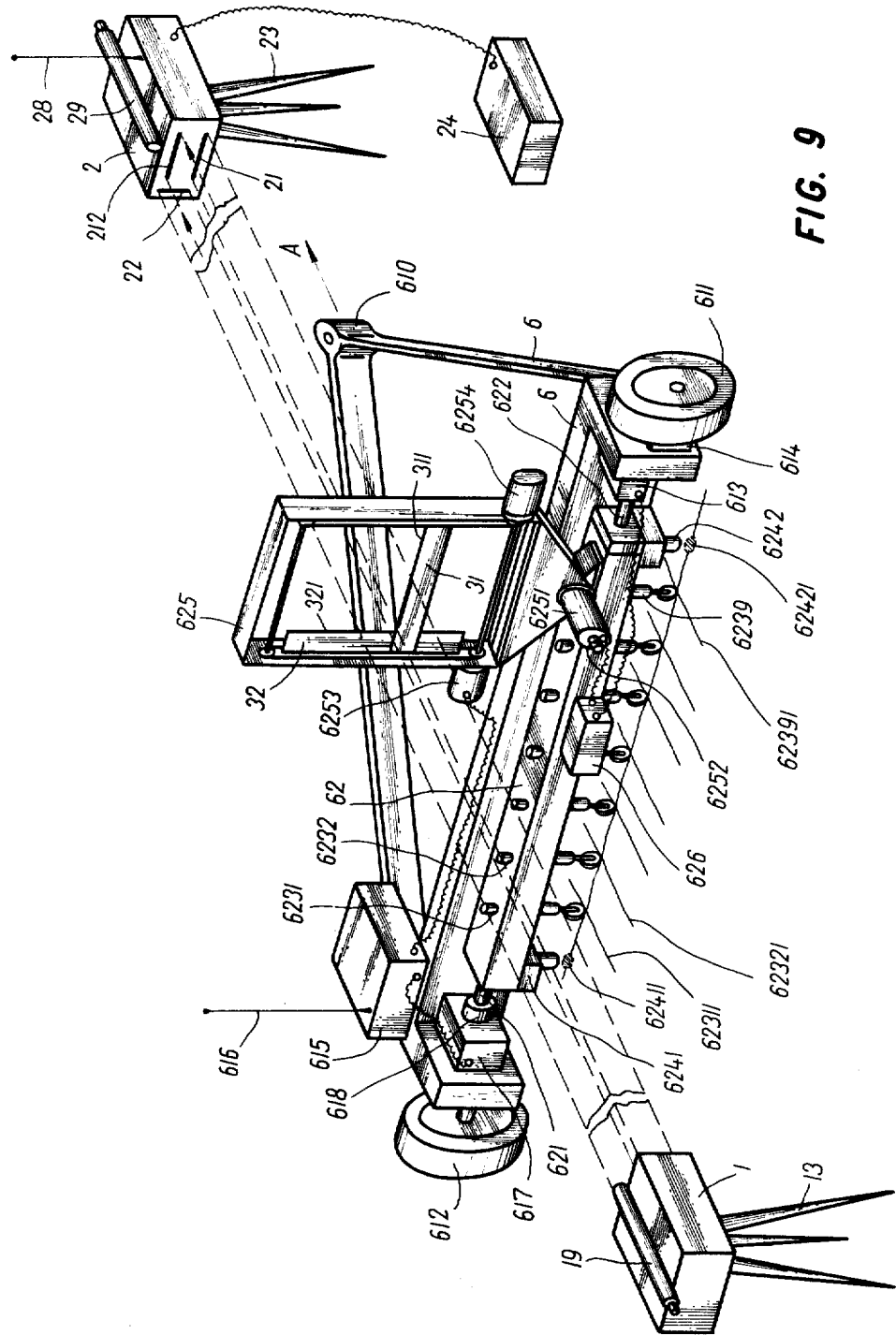
FIG. 9 an arrangement for evaluating of profiles, guided by the arrangement according to this invention.

FIG. 9 shows an arrangement for evaluation of profiles, for instance of roadways or of airport runways. The arrangement comprises a supporting frame 6 resting on wheels 611 and 612. A measuring ledge 62 is provided in this frame 6 slidably and pivotally on bolts 621 and 622, with linear displacement transducers 6231, 6232, 6239 situated on this measuring ledge 62, which transfer an information about the distance of the measuring ledge 62 from the measured surface of the body along longitudinal profiles 62311, 62321, 62391 in the form of an electric signal. Marking means 6241, 6242 are furthermore provided on the measuring ledge 62 creating on the evaluated profile in the course of movement of the whole arrangement orientation marks 62411 and 62421. A case 625 will screens 31 and 32 is furthermore provided on the measuring ledge 62 pivotably around the axis 6252, the inclination of which is stabilized by a servomechanism 6251 according to informations of a device 626 for measuring inclinations, connected firmly with the measuring ledge 62 so that the working edge 311 of the screen 31 arranged slidably in the case 625 is maintained in a horizontal position. A further screen 32, the working edge of which is perpendicular to the working edge 311 of the slidable screen 31, which screen 32 is fixed to the case 625, is provided in addition to the slidably arranged screen 31. The pivotable movement of the measuring ledge 62 around the bolts 621 and 622 is controlled by the servomechanism 613 according to informations of the device 626 measuring inclinations so, that the working edge 321 of the screen 32 is maintained in a vertical position.

At the beginning of the measured section the transmitter 1 is situated on a stand 13 and a receiver 2 of beams of light transmitted from the transmitter 1 is situated on a stand 23 at the end of this section. The transmitter 1 and receiver 2 are mutually adjusted as indicated in FIG. 1 by levelling devices 19 and 29, whereby the active zones of beams of light received by optical slot systems 21, 22 and 212 are passing through the case 625. The supporting frame 6 is pulled for instance by a car by means of the trailer coupling 610 in direction A i.e. along the evaluated section.

Informations about screening of the active zone of the beam of light by the working edge 311 of the screen 31 received by way of the optical slot system 21 are transmitted wirelessly from the antenna 28 to the antenna 616 of the receiver 615 and the working edge 31 is adusted by the servomechanism 6253 to the middle of this active zone according to this information. Similarly are transmitted informations about screening of the active zone of the beam of light received by way of the optical slot system 22 by the working edge 321 of the screen 32 and the position of the measuring ledge 62 and thus also of the screen in direction of the axis of the bolts 621 and 622 with respect to the frame 6 is adjusted so, that the working edge 321 of the screen 32 is maintained in the middle of this active zone. The function of the radiating reference beam received by way of the optical slot system 212 is analogous to the function of the reference beam of light as described on hand of FIG. 8.

In order to facilitate the control of the trailing car, a coarse directional, indicator is provided on this car showing the position of the measuring ledge 62 with respect to the frame 6 as read by the displacement transducer 618.

This described arrangement enables to read and to register automatically by means of devices situated on the trailing car the following values:
1. the position of the measuring ledge 62 along the measured section for instance according to the informations of the device 614 for measuring distances,
2. readings of linear displacement transducers 6231, 6232, 6239,
3. position of the working edge 311 of the screen with respect to the measuring ledge 62 according to informations of the pick-up device of this position,
4. Informations about the inclination of the axis of the measuring ledge 62 with respect to a horizontal plane obtained from the device 626 for measuring inclinations.

In case of a quick movement of the arrangement where the working edge 311 of the screen 31 cannot be maintained in the ideal middle of the active zone of the respective beam of light, it is suitable to record besides other values by the recording device 24 also the instantaneous values of the analog signal indicating the degree of screening of the active zone of this beam of light.

It is possible to establish from all these values the shape of the surface of the measured roadway, airfield or other body.

Figure 10:
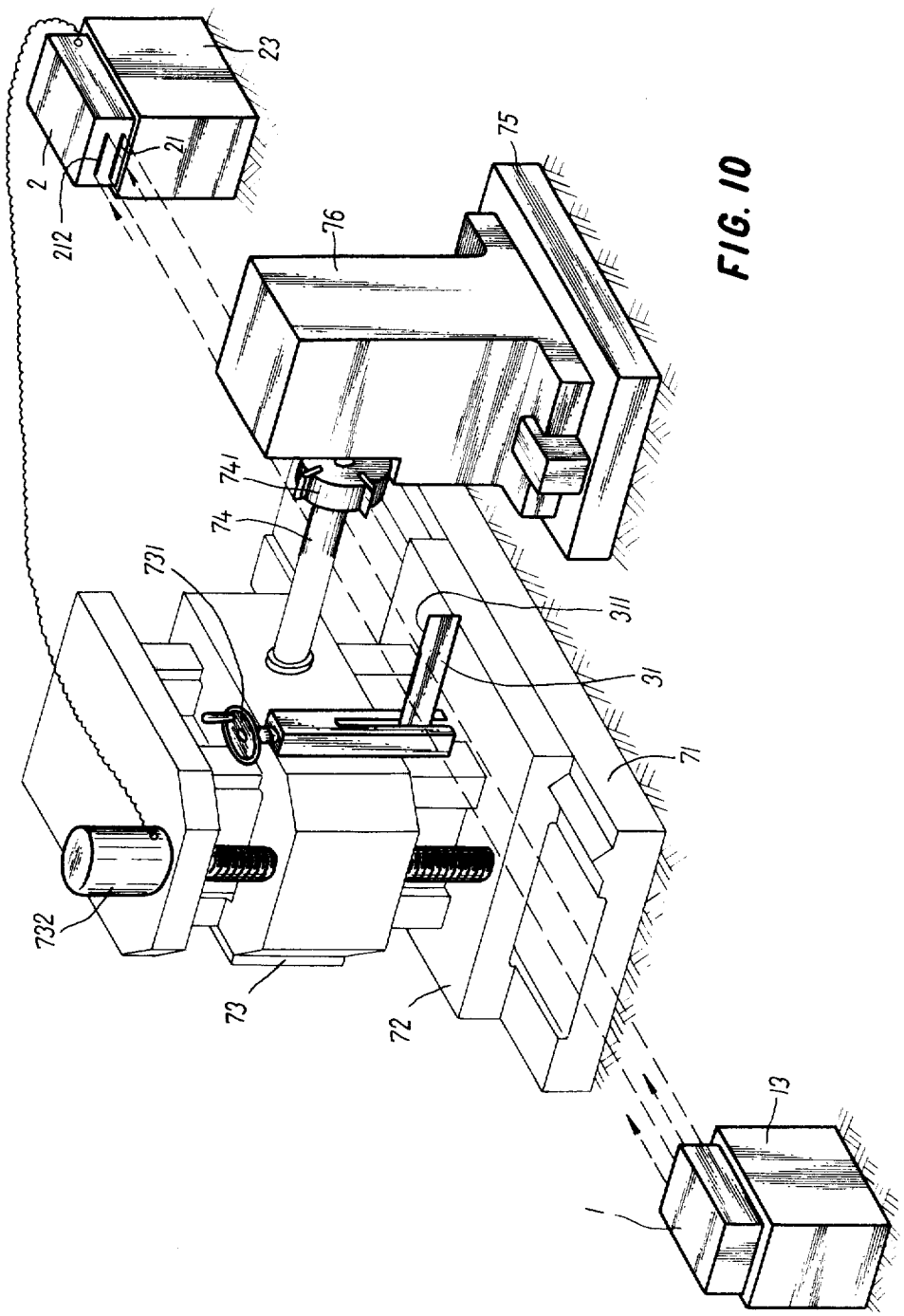
FIG. 10 the application of the arrangement according to this invention for the control of the position of the working tool of a large machine tool.

FIG. 10 shows the application of the arrangement according to this invention for the control of the position of a working tool of a large machine tool while eliminating the influence of an inaccurate planar shape or a deformation of for instance the supporting frame 71 of this machine. A stand 75 with the worked object 76 is arranged on a stift common frame. Further bulky stands 13 and 23 for the transmitter 1 and receiver 2 are also fixed on the common stift frame. The supporting bed 71 of a machine tool rests equally on this common stift frame independently from the stands 13, 23 and 75. A support 72 can travel horizontally on this supporting bed 71, with a working head 73 with a spindle 74 for the working tool 74, travelling vertically on the supporting bed 71. A screen 31 is slidably supported on the working head 73, with the possibility to measure and read on a scale on an adjusting wheel 731 the position of the screen 31 with respect to the axis of the spindle 74. By adjustment of the screen 31 to the middle of the active zone of the beam of the light received by way of the optical slot system 21 of the receiver 2 it is possible to achieve a position of the working edge 311 of the screen 31 on an ideal straight line determined by the axis of the active zone. The position of the spindle 74 with respect to the working edge 311 can be read on the adjusting wheel 731. According to readings from the receiver 2 of the beam of light it is possible to control in the course of the travel of the support 72 the position of the working head 73 and thus also of the spindle 74 with the working tool 741 by the servomechanism 732 so that the screen 31, with the spindle 74 connected firmly therewith are moving along an ideal straight line without copying possible uneven parts of the supporting bed 71. The function of the reference beam of light, received by way of the optical slot system 212 is analogous to the function of the reference beam from FIG. 8.

FIG. 11 shows a lathe provided with an arrangement according to this invention, where the circumference of the worked object performs the task of the screen. The worked object 81 is clamped in a chuck head 83 and worked by means of a knife 82 clamped in a support 821. The transmitter 1 and the receiver 2 of the beam of light emitted by the transmitter 1 are arranged slidably on stands 13 and 23 which are fixed to the lathe bed 84 for instance by being attached to a common stift frame. The axis of the active zone 1121 of the measuring beam of light transmitted by way of the optical slot system 11 and received by way of the optical slot system 21 is perpendicular to the axis of the worked object 81. The diameter of the worked object 81 can be at a constant screening of the active zone 1121 by the circumference 811 of this object 81 determined from the positions of the transmitter 1 and receiver 2, which positions are read on scales 133 and 233 of adjustment means, which consist for the transmitter 1 of a control wheel 131, a motion screw 134 connected with this wheel 131 and a sliding guiding 132 and for the receiver 2 similarly of a control wheel 231, a motion screw 234 and a sliding guiding 232. When working the object to a predetermined diameter, it is possible to adjust first by means of the control wheels 131 and 231 a stable position of the transmitter 1 and receiver 2 and to follow in the course of working on an indicator 27 the degree of screening of the active zone 1121, and thus the achieved diameter of the worked object 81. The signal indicating the degree of screening of the active zone 1121 can be also utilized for an automatic control of the feeding of the knife 82 into engagement. When working shapes with variable diameter it is advantageous to fix the stands 13 and 23 not to the lathe bed 84 but to the lathe slide 85, enabling thus a measurement of the just worked object 81 directly behind the knife 82 at any place of the worked object 81. The function of the reference beam of light transmitted by way of the optical slot system 112 and received by way of the optical slot system 212 is similar to the function of the reference beam as described on hand of FIG. 8.

Some further properties and applications of the arrangement according to this invention will be described in the following.

The arrangement according to this invention consists of a transmitter 1 of a modulated beam of light transmitted by way of an optical directional slot system 11 and of a semiconductor light emitting element 14 situated in this transmitter 1, furthermore of a receiver 2 of the modulated beam of light received by way of a directional optical slot system 21 and a small active area photodetector 25, whereby said receiver 2 of the modulated beam of light is particularly sensitive to the wave length and the way of modulation of the light beam transmitted by the transmitter 1. The receiver 2 is situated within the narrow emission angle $\alpha$ of the directional optical system 11 of the transmitter 1 and the transmitter 1 is simultaneously within the narrow angle $\beta$ of reception of the directional optical system 21 of the receiver 2 as indicated in FIG. 1. The arrangement has its maximum range and accuracy if the transmitter 1 is in the axis of the angle $\beta$ of reception of the receiver 2 and the receiver 2 is simultaneously in the axis of the angle $\alpha$ of transmission of the transmitter 1. For the same reason it is necessary to adjust the outlet slots 111, 211 of the directional optical systems 11 and 21 of both the transmitter 1 and receiver 2 to be mutual parallel as indicated in FIG. 2. The transmitter 1 and receiver 2 should be for a quick mutual adjustment provided with suitable optical aiming systems which should be parallel and firmly connected with the directional optical slot systems 11 and 21 of the transmitter 1 and receiver 2 and in addition by suitable aiming marks for mutual alignment. These optical aiming systems can be identical with the optical levelling means 19 and 29, which are advantageously provided on the transmitter 1 and receiver 2 for a number of applications. A further substantial part of the arrangement is a screen 31, the working edge 311 of which is mostly parallel or perpendicular to the slots 111, 211 of the directional optical slot systems 11, 21 of the transmitter 1 and receiver 2.

The arrangement described as fundamental embodiment operates as follows. The semiconductor light emitting element 14 of the transmitter 1 emits a modulated, advantageously directional light beam impinging uniformly on an optical slot system 11 of the transmitter 1, which narrows the transmitted light beam to a divergence about 1° and simultaneously adjusts its cross section to the shape of an elongated rectangle or slot 111. The thus adjusted light beam emitted by the transmitter 1 strikes in case of a correct mutual alignment of the transmitter 1 and receiver 2 the inlet slot 211 of the directional slot optical system 21 of the receiver 2, is concentrated by this optical system 21 and impinges on the active area of the small area photodetector 25, which is particularly sensitive to the wave length of the radiation used. By the aid of the following electronic circuits of the receiver 2, which react solely to the used way of modulation of the impinging light, a signal is detected, the magnitude of which depends on the distance and on the optical transmittance of the medium between the transmitter 1 and receiver 2 and in a rather small degree also on smaller variations of the relative inclination of the optical axes 1111, 2111 of the directional optical slot systems 11 and 21 of the transmitter 1 and receiver 2 providing, that the basic mutual alignment of the transmitter 1 and receiver 2 is not disturbed, i.e. so far the receiver 2 remains within the emission angle $\alpha$ of the transmitter 1 and the transmitter 1 remains within the angle $\beta$ of reception of the receiver 2. The described arrangement is therefore if compared with similar surveying devices relatively unsensitive to different (for instance thermal) deformations of the stands 13 and 23 supporting the transmitter 1 and receiver 2, equally to small movements caused by wind or deformations of the ground under the transmitter 1 and receiver 2.

It is possible to adjust the magnitude of the signal on the output of the receiver 2 to a predetermined magnitude (for instance 100%). From the point of view of geometrical optics, only that part of energy of the emitted beam of light contributes to the magnitude of the signal, evaluated by the receiver 2, which is propagated within the space of the elongated prism, the basis of which are formed by the surfaces of the slots 111, 211 of the directional optical slot systems 11 and 21 of the transmitter 1 and receiver 2. If the dimensions of these slots 111, 211 are equal and the slots are parallel, this space of propagation of energy of the emitted beam of light has between the transmitter 1 and receiver 2 a constant cross section. This space will be called in the following the active zone 1121 of the radiating beam. If we now introduce a screen 31 into any place beyond the active zone 1121, we cause no changes of the magnitude of the signal detected by the receiver 2, even if the screen 31 is already in the space determined by the angle $\alpha$ of emission of the transmitter 1 or within the angle $\beta$ of reception of the receiver 2. If however the screen 31 enters the active zone 1121, the signal detected by the receiver 2 is reduced, as only part of the energy transmitted via the active zone 1121 strikes the receiver 2. An important property of the described arrangement is, that the signal evaluated by the receiver 2 is reduced from a maximum up to a zero value by the sole movement of the screen within the height $a$ in case of an arrangement according to FIG. 2, or within the width $b$ in case of an arrangement according to FIG. 3 and that this property remains unaltered in any place of the active zone 1121 in the space between the transmitter 1 and receiver 2.

The dependence of the relative magnitude of the signals S detected by the receiver 2 on the movement $x$ of the screen 31 within the active zone 1121 is shown in FIG. 4. The curve $k$ corresponds to the arrangement according to FIG. 2, where the working edge 311 of the screen is parallel with the longer sides of the slots 111, 211 of both directional optical slot systems 11 and 21 of the transmitter 1 and receiver 2 and the curve $m$ corresponds to the arrangement according to FIG. 3, where the working edge 311 of the screen 31 is perpendicular to said longer sides of the slots 111, 211. In both cases the movement $x$ of the screen 31 is supposed to be perpendicular to its working edge 311 and to the axis (direction) of the active zone 1121. If we reduce the dimension of the slots 111, 211 in direction of the movement $x$, the relative accuracy of determination of the position of the screen 31 in this direction is increased. If however this dimension of the slots 111, 211 becomes comparable with the wave length of the used radiation, the laws of geometrical optics cease to be valid and the signal detected by the receiver 2 is then determined predominantly by the diffraction effect on the working edge 311 of the screen 31. This phenomenon can be already observed if the width of the slots 111, 211 amounts to several tenths of a millimeter. The dependence of the relative magnitude of the signal S on the movement $x$ of the screen 31 is in this case shown in FIG. 4 by the curve $o$.

The proper measuring method with this arrangement consists in that the transmitter 1 and receiver 2 are situated in front of the beginning and behind the end of the measured track and the positions of the centers of the slots 111, 211 of their directional optical slot systems 11 and 21 are adjusted for instance by using levelling means 19 and 29 provided on the transmitter 1 and receiver 2. The relative adjustment of the transmitter 1 and receiver 2 is accomplished according to FIG. 1 and by adjustment of the amplification in the receiver 2 (or possibly of the output of the transmitter 1), the magnitude of the signal on the output of the receiver 2 is adjusted for an unscreened active zone 1121 to a reference value for instance 100%. If now a screen 31 enters the active zone 1121, the signal detected by the receiver 2 is reduced and by its comparison with the reference value (100%) the position of the working edge 311 of the screen 31 within the active zone 1121 is determined by means of the respective curve from FIG. 4. An analog signal proportional to the change of position of the screen 31 in the direction across the active zone 1121 is obtained in the range of the central straight section of this curve. As the position of the axis of the active zone 1121 where the centers of the slots 111, 211 of the directional optical slot systems 11, 21 of the transmitter 1 and receiver 2 are laying are determined with respect to the neighbourhood, for instance with the aid of levelling means 19 and 29 provided on the transmitter 1 and receiver 2, it is also possible to evaluate the position of the working edge 311 of the screen 31 in a coordinate system firmly established in this neighbourhood. For accurate levelling operations it is advantageous to select a certain reference level $k$ (in FIG. 4 for instance this level $k = 50\%$) and to engage the working edge 311 of the screen 31 into the active zone 1121 always so, that the signal detected by the receiver 2 is just equal to this reference lebel $k$. In that case the working edge 311 of the screen 31 is just touching the optical aiming line, the position of which within the active zone 1121 is explicitly determined by the reference level $k$ and its position is also known in the coordinate system established in the surrounding space where the arrangement is used for instance by means of the already mentioned levelling means 19 and 29. It is possible to determine by means of classical measuring apparatus the distance of any measured point of this space from the optical aiming line or evaluate (by means of the analog signal from the receiver 2) continuously (possibly also automatically) variations of this distance within a certain range (i.e. at the maximum $\pm a/2$ or $\pm b/2$).

In order to be able to adjust the working edge 311 of the screen 31 in alignment with the optical aiming line in the described manner, a motion device 41 controlled manually or automatically (for instance by a servomechanism) has to be provided for the screen 31 and the operation of this motion device 41 has to be controlled according to informations about the magnitude of the signal detected by the receiver 2. This information is transmitted from the receiver 2 to the motion device 41 of the screen 31 via a cable or wirelessly either as an analog signal indicating directly the degree of screening of the active zone 1121 or otherwise the position of the working edge 311 of the screen 31 within the active zone 1121 or solely as a logic signal corresponding to the logic information, whether the working edge 311 of the screen 31 did not yet reach the predetermined aiming line within the active zone 1121, or whether is is just in alignment with this optical aiming line, or has already crossed this aiming line. It is possible to secure by these transmission methods an automatic adjustment of the working edge 311 of the screen 31 in alignment with the aiming line with an accuracy which depends in addition to the common limiting factors also on the quality and operating errors of the servomechanism controlling the motion device 41 of the screen and also on the properties of the transmission track where the energy of the active zone 1121 is propagated. The most important factors are here: a constant output of the transmitter 1, a constant sensitivity of the receiver 2 and a constant transparence of the medium where the energy of the active zone 1121 is propagated. The constant output of the transmitter 1 can be secured by stabilisation and by thermal comepnsation of electronic circuits of the transmitter 1 and of the proper semiconductor light emitting element 14 by some known methods. The sensitivity of the receiver 2 depends substantially on the level of the external illumination, what is determined by the commonly known properties of photodetectors (particularly of for instance phototransistors), the sensitivity to small variations of incident light (i.e. the modulation) is particularly dependent on the level of the superposed illumination at rest (or of the so called additional illumination). The sensitivity of the photodetector to small variations of the incident light (or to the useful modulation component) usually increases with increasing additional illumination up to saturation and simultaneously the relative change of this sensitivity caused by changes of the level of the external illumination decreases. It is therefore advantageous to illuminate additionally the used photodetector 25, using advantageously a special light emitting diode 26 (for instance a galliumarsenide diode) situated suitably in the spacial angle of reception of the additionally illuminated semiconductor photodiode 25 (for instance according to FIG. 5). The use of a semiconductor light emitting diode 26 provides in comparison with the classical additional illumination for instance by an incandescent lamp a substantial improvement of the signal to noise ratio on the input of the receiver 2.

The influence of the optical tranmissivity of the medium where the energy of the beam of light is propagated can be substantially limited by the use of a reference beam of light, which is generated by similar means as the measuring beam of light which has been up to now described only, and which will be in the follwing after introduction of this reference beam of light called the measuring beam of light. The reference beam of light is with respect to the measuring beam of light arranged so as to be propagated within a part of the space closest to the active zone 1121 of the measuring beam of light, but so as not to be influenced by the screen. The optical directional systems 112 and 212 of the transmitter 1 and receiver 2 of the reference beam of light need not be slot systems, but the slot systems allow the relatively closest approach of the active zones of the reference and measuring beams of light and thus the elimination of the influence of strictly local properties of the optical medium, through which both beams of light are propagated. The similar or equal directional characteristics of the optical systems 11 and 21 and 112 and 212 of the measuring and reference beams of light contribute to a further reduction of dependence of the accuracy and quality of measuring on the stability of relative inclination of the optical axes 1111, 2111 of the transmitter 1 and receiver 2. The signal obtained by evaluation of the reference beam of light in the receiver 2 can be utilized in a different way for instance for the control of the output of the transmitter 1 of the measuring beam of light, for the control of the sensitivity of the receiver 2 of the measuring beam of light or for provision of a comparison level K for evaluation of the measuring beam of light or for provision of the sole ratio of signals of the measuring and reference beams of light. All these applications of the signal of the reference beam of light provide the important properly of the whole arrangement, that the position of the optical aiming line within the active zone 1121 of the measuring beam of light (or also the predetermined position of the working edge 311 of the screen 31 within this beam) is no more bound to a certain absolute value of the received energy of active zone 1121, but is geometrically stable, determined by the chosen relation between the reference and measuring beams of light.

If the automatic measurement of the position of a point of some object with respect to a given optical aiming line is utilized for the automatic control of for instance a manufacturing process and if in the course of measurement some undesirable screening of the active zone 1121 by some object different from the screen 31 can occur, such a screening should be indicated and it is necessary to introduce some measures to prevent possible consequences of such an undesirable interaction, for instance to disregard results of such measurements. As most reliable indication of such an undesirable screening can serve a blocking beam of light, provided close to the radiating measuring or possibly also reference beam without being influenced by the normal function of the screen 31 of the measuring beam of light. The blocking beam of light is generated by similar means as the reference beam of light and the same holds true about properties of directional optical systems as has been mentioned in connection with the reference beam of light. It is possible in some cases to combine the function of the blocking beam of light with that of the reference beam of light, i.e. the complete loss of signal of the reference beam of light (or its reduction below a predetermined minimum limit) is considered to be an indication of an undesirable screening by a foreign object in the space of the active zone 1121 of the measuring beam of light.

Up to now only an arrangement for measuring the distance of one point from a single optical aiming line has been considered, or the measuring (or surveying) of a single track (or a system of points) which are in one preferred direction (that is a direction of movement perpendicular to the working edge 311 of the screen 31) with respect to this single optical aiming line and proceeding along this line. It is of course possible to use simultaneously two or more independent measuring beams of light, creating two or more independent optical aiming lines, whereby the distance of two or more points of a single body with respect to these lines can be measured simultaneously in a similar manner as already described. Thus individual degrees of freedom of the body, to which the individual screens are connected in the checked points of the body can be controlled (or limited), until the position of this body in space, where the required aiming lines have been provided, is exactly determined. Variations of analog signals on the outputs of receivers corresponding to the measuring beams of light can serve for the automatic evaluation of changes of dimensions of this body in directions perpendicular to the working edges of corresponding screens, or these analog signals (or derived logic signals) can be utilized for automatic maintenance of this body in the required position with respect to contact points of the optical aiming lines with the working edges of corresponding screens. If in the course of such an automatic limitation of the position of the observed body 1° of freedom is left without limitation, for instance in direction of displacement along predetermined optical aiming lines, a guiding of the body can be achieved along a track stipulated by the optical aiming lines and by distances of checked points of the guided body (i.e. of points of connection of the screens) from working edges of these screens.

It is generally not necessary to limit the displacement of the guided body to a straight track, defined for instance by several parallel optical aiming lines. It is possible to simultaneously turn or laterally shift the guided body, that is in combination with the primary movement to guide the body along a complicated curve if in the course of the primary advance movement of the guided body the parameters, which limit the remaining degrees of freedom, are purposely changed, or if the elements which determine the position of the guided body with respect to contact points of optical aiming lines with working edges of corresponding screens are changed. Similar elements are the mutual distances of optical aiming lines and distances of said contact points of screens with corresponding optical aiming lines from the checked points on the guided body. By a suitable continuous change of these elements in the course of the primary advance movement of the guided body by the use of a suitably chosen program for these elements, a resulting movement of the guided body along a prior chosen curve can be achieved, which curve may be a complex spacial configuration. This program can be therefore introduced by following methods:

1. By a suitable selection of the mutual position of the used optical aiming lines so that they are divergent and/or at an angle, without coming in contact.
2. By a change of mutual distances of used optical aiming lines in dependence on the track covered by the guided body in direction of the primary advance movement.
3. By a change of contact points of working edges of screens with the respective optical aiming lines, obtained either by an inclination of the working edges of these screens with respect to directions of allowed movements of these screens or by shaping the profiles of the working edges of these screens up to shapes of spacial curves or by a combination of both these methods.
4. By a change of the distance of contact points of working edges of screens with corresponding optical aiming lines with respect to checked points of the guided body (i.e. with respect to places of connection of these screens with the guided body) in dependence on the track covered by the guided body in direction of the primary advance movement.
5. By a combination of some or all mentioned methods simultaneously.

The most important method of introduction of programs for changes of elements determining the position of the guided body with respect to optical aiming lines is from the practical point of view the method according to point 4 as is also evident from the above mentioned practical examples.

It should be furthermore mentioned that the program of changes of elements determining the position of the guided body with respect to optical aiming lines need not be applied in dependence of the distance covered by the guided body in direction of the primary advance movement, but can be also introduced in dependence on other values, for instance on time.

The number of optical aiming lines (and thus also of independent measuring beams of light realised by independent couples transmitter - receiver) which will be required in the optimum case for guiding of a body along a given track depedns on concrete requirements in any case, above all on the accuracy and sensibility of the whole arrangement in some preferred directions of movement of the guided body.

Each of the optical measuring beams used in connection with arrangements for guiding a body along a given track can be provided according to its importance or claims on accuracy or safety with a corresponding reference or blocking beam of light.

In the described arrangement for generating measuring beams of light, typical optical slot systems have been used, the inlet (or outlet) surface has always the shape of a relatively narrow but simultaneously long slot, what is a substantial feature of this solution.

This shape of the inlet (or, outlet) surface of optical systems for generating measuring beams of light allows to achieves simultaneously for an achievement of maximum required accuracy a maximum range of the arrangement, and is therefore in similar cases the optimum shape.

The analog signal, which is received on the output of each receiver of the measuring beam of light can be utilized for indication of the position of the working edge of the screen within the active zone of the measuring beam of light along the whole track determined by the width of the slot of the optical directional system of the transmitter and receiver. By changing the width of these slots it is practically possible to choose within certain limits a compromise between accuracy and range of measurement by means of an analog signal (or also the range of the whole arrangement).

If a high accuracy of measuring and simultaneously a wide range in readings of measurements of distances is required, it is possible, as already described, to adjust the working edge of the respective screen in contact with the corresponding optical aiming line automatically by means of a motion device of the screen controlled by a servomechanism controlled in turn by orders derived from an analog or logic signal from the output of the respective receiver. The reading of the measured distance is achieved by an analog or digital evaluation in a stabilised condition of the position of the servomechanism controlling the movement of the screen. Thus non linearities are also eliminated, which to a certain degree influence the accuracy of measurements in the course of evaluation of the sole analog signal on the receiver output. If in addition to a high accuracy and wide range of the measured distance also a high speed of evaluation of the measurements is required, where the described servomechanism is no more capable to take its stabilized position with the needed accuracy, it is advantageous to evaluate the instantaneous positions of this servomechanism by way of a linear inertia element, the impulse response of which is the same as the impulse response of the whole receiver system and make simultaneously a reading of the analog signal on the output of this receiver. From these two obtained values it is possible to evaluate the real magnitude of the measured distance and reduce the influence of the dynamic properties of the servomechanism on the overall error of measurement.

For direct measurements of minor variations or within a small range of distances from the optical aiming line, the linear dependence of the analog signal on the movement of the screen can be advantageously utilized, which dependence exists within a certain zone laying symmetrically with respect to the axis of the active zone of the measuring beam of light. The extent of this linear zone changes along the measured track according to a dependence symmetrically with respect to the center of the measured track (i.e. of the distance transmitter-receiver), so far the sizes of the slots of the directional optical slot systems of the transmitter and receiver are equal. The dependences of the analog signal, on the movement of the screen are for a certain arrangement of the measuring system constant and can be analytically expressed, particularly for simplified models or cases, which could in this respect occur in practice. (see for instance the measuring as described on hand of FIG. 3).

The extent of utilization of the analog signal for a direct evaluation of a measured distance (or changes of this distance) with respect to an optical aiming line can be continuously changed as a compromise with the accuracy of measurement by simultaneous inclination of parallel slots of the transmitter and receiver with respect to the direction of the working edge of the screen, whereby the range of the arrangement remains the same. By simultaneous inclination of the axes of the slots of the transmitter and receiver not only the extent of movement of the screen is changed, where an analog signal can be obtained (and thus also an achievable accuracy of measuring) but it is also possible to adjust the course of the functional dependence of the analog signal on the movement of the screen in individual places of the measured track.

The error in measuring the distance with respect to the optical aiming line, particularly due to influence of diffraction phenomena is maximum at the center of the measured track, whereas for laser systems (or for classical levelling) for measurements on the same length of the base it is maximum on the end of the measured track. The arrangement according to this invention comprises therefore already for this reason all conditions for twice the accuracy of these known systems.

It is possible to reduce or fully eliminate the influence of diffraction phenomena and also the influence of a changing course of the functional dependence of the analog signal on the magnitude of screening along the measured track by evaluation of the mean value of measurements obtained by movement of the working edge of the screen into the active zone of the measuring beam of light from one side (for instance from the bottom) and on the other hand by movement of the working edge of the screen from the other side (for instance from the top), whereby both these measurements are evaluated with respect to the same comparison level $k$. Thus the problem of screening of the active zone becomes a problem symmetrical with respect to the axis of the measuring beam of light and all phenomena both symmetrical to this axis (i.e. the mentioned functional dependences of the analog signal) or non symmetrical (for instance diffraction phenomena) are eliminated according to the accuracy with which the symmetry of both said measurements by means of the screen will be maintained.

The accuracy of measurement can be also influenced by fluctuations of properties of the optical medium along the measured track (for instance changes of the index of refraction of the medium. These fluctuations have generally statistic properties characterised by a relatively short correlation time (below 1 second). The respective measuring error due to these influences can be reduced arbitrariry by choosing the time of evaluation which we take for a single adjustment of the screen. The arrangement according to this invention which operates with this property differs thereby from for instance the optical reading with classical levelling measurements, where the picture of the read signal is determined finally and with limited accuracy by properties of the whole optical medium, through which it is observed and it is impossible to improve it further for one reading.

The stability of the aiming line is for the application according to this invention determined by the absolute stability of the position of the end points of this line, i.e. for instance by the stability of positions of the geometrical centers of the outlet slots of directional optical slot systems of the transmitter and receiver. This stability can be very good and can be maintained for a long time. It is thus possible to check (possibly also automatically) the progressive long time settlement of the soil, the stability of points of a triangulation system even of the highest order. The radiation used generally for measurements with the arrangement according to this invention i.e. a radiation close to the infrared region (for instance around 1 $\mu$m) is less influenced by properties of the medium along the track (for instance fog, rain or similar) so that the elimination of these influences by means of the above described relative measurements using a reference beam of light can be more accurate. The reference (and also blocking) beam of, light must be geometrically close to the measuring beam of light but otherwise discernible therefrom either by the modulation method or by direction of propagation and finally less suitably by the wave length of radiation. The combination of the measuring beam of light with the reference (or also blocking) beam of light which is propagated in the opposite direction i.e. the transmitter of the reference or blocking beam of light is situated on the site of the receiver of the measuring beam of light and transmits the reference (or blocking) beam of light along the measured track, which beam is received by the receiver of the reference (or blocking) beam of light situated at the site of the transmitter of the measuring beam of light which arrangement provides in addition the possibility of a simple transmission of a reference signal for a synchronous detection of the measuring beam of light. The use of a synchronous detection provides further possibilities for evaluation of the measuring beam of light in improving the signal to noise ratio and in a relative increase of the speed of response.

It can be proved that the shape of the working edge of the screen (the cross section perpendicular to this working edge) has no substantial influence on the quality and accuracy of measurement (including the evaluation in case of diffraction). It is therefore possible to measure with the arrangement according to this invention also directly by observing the circumference (the outline) of rotating or moving bodies (see FIG. 11) or to measure for instance the position of forge rolls or rolling mills.

The magnitude of the radiating power of the beams of light of the described arrangements is not high ($P \sim 1$ m W is sufficient) it is therefore in comparison with laser systems substantially lower and operation with this arrangement is therefore perfectly safe.

We claim:

1. Arrangement for the measurement, checking and control of the position of a selected point of an object with respect to an optical aiming line extending between the center of an optical system of a transmitter of a measuring beam of light and the center of an optical system of a receiver which is selectively sensitive to the wavelength and modulation of the light beam, the transmitter comprising a semiconductor light emitting diode having associated therewith a first directional slot system associated with the diode and disposed in the path of the light beam emitted thereby, the slot in said first system having a length substantially larger than its width, the receiver comprising small area semiconductor photodetector means having associated therewith a second directional slot system in the path of the light beam, the slots in said first and second directional slot systems being aligned and dimensionally coextensive, a screen in the path of propagation of the light beam between the transmitter and receiver connected with the selected point of the object, and a motion device interconnecting the screen with the selected point.

2. Arrangement as in claim 1, in which the motion device is controlled in dependence on the intensity of the light beam picked up by the receiver.

3. Arrangement as in claim 1, in which the object is moved along a track between the transmitter and receiver, and in which the arrangement further comprises, in combination, means coupling the object to the screen for translating variations in displacement of the object into corresponding movements of the screen, means for establishing a program corresponding to variations in displacement of the object as it moves along the track, and means for coupling the program to the translating means to correspondingly vary the position of the screen.

* * * * *